US006614392B2

(12) United States Patent
Howard

(10) Patent No.: US 6,614,392 B2
(45) Date of Patent: Sep. 2, 2003

(54) COMBINATION RFID AND GPS FUNCTIONALITY ON INTELLIGENT LABEL

(75) Inventor: John Howard, Wildwood, MO (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/005,187

(22) Filed: Dec. 7, 2001

(65) Prior Publication Data

US 2003/0107515 A1 Jun. 12, 2003

(51) Int. Cl.[7] .............................. H04B 7/185; G01S 5/02
(52) U.S. Cl. ............................ 342/357.07; 342/357.06
(58) Field of Search .............................. 342/51, 357.06, 342/357.07; 701/213, 215; 340/825.54, 825.34

(56) References Cited

U.S. PATENT DOCUMENTS

| 5,574,470 | A | | 11/1996 | de Vall ........................ 343/895 |
|---|---|---|---|---|
| 5,626,630 | A | * | 5/1997 | Markowitz et al. ............ 607/60 |
| 5,942,977 | A | | 8/1999 | Palmer et al. ............ 340/572.5 |
| 6,232,880 | B1 | * | 5/2001 | Anderson et al. ......... 340/573.3 |
| 6,323,782 | B1 | * | 11/2001 | Stephens et al. ........ 340/825.31 |
| 6,353,406 | B1 | * | 3/2002 | Lanzl et al. ................. 342/118 |

* cited by examiner

Primary Examiner—Dao Phan
(74) Attorney, Agent, or Firm—Foley & Lardner

(57) ABSTRACT

A intelligent label comprising a radio frequency transponder coupled to a global positioning system, both of which are attached to a substrate. Once the intelligent label is attached to an object, it will enable the object to be tracked as it moves from one point to another point. As the object moves, the global positioning system receives signals from GPS satellites and processes those signals into location data. The data is then either transmitted directly to an interrogation station by the radio frequency transponder, or stored in a memory. The memory serves to allow all or part of the previous location data to be stored for transmittal to an interrogator at a later date.

43 Claims, 2 Drawing Sheets

COMBINATION RFID AND GPS FUNCTIONALITY ON INTELLIGENT LABEL

BACKGROUND OF THE INVENTION

The present invention relates generally to tracking a letter, package, or other movable object, and more particularly to a global positioning receiver, a memory device, and a radio frequency transponder embedded in a label or other thin object.

There is a desire on the part of both individuals and corporations to be able to track or locate packages, letters, and other movable objects placed in the stream of commerce, as well as household goods and valuables that become lost or stolen. In many cases, these items tend to have a high dollar and or a high sentimental value, or are extremely time-sensitive. The incidences of lost or misplaced cargo can detract significantly from the bottom line of both transportation companies and the uninsured owners of the goods. Keeping track of where a particular package is located is a labor intensive task for the transportation company handling the goods, and the consumer must rely on the shipping company to actively inform him or her of the past whereabouts of the package, which tends to consist of posting the information on the shipper's web site. Usually, the information known to the shipper is restricted to the location where the package handler physically obtained the package and actively identified the package using, for example, an optical scanner. While radio frequency identification has been implemented in an effort to automate the process (i.e. eliminate the human package handler), the basic problem still remains: information cannot be easily obtained concerning the whereabouts of the package between the active identification locations. Because of this, a low cost, uncumbersome, and unobtrusive means is needed to provide accurate tracking information of a package or other moveable object.

Radio frequency identification systems rely on radio frequency transponders to transfer information to interrogation stations. Unlike other information communication systems, radio frequency transponder systems are not restricted to line of sight or hard wire communications, and are most desirable where wireless communications are a necessity. Information transferred by a radio frequency transponder system typically comprises identification data, but can also include messages, depending on the sophistication of the electronics used in the system.

Radio frequency identification systems include an interrogator, which typically employ an exciter that transmits a radio frequency excitation signal, and a transponder. The transponder is energized by the excitation signal to transmit a signal, including an identification code or other information, back to the interrogator. The transponder receives a radio frequency signal, or, more specifically, is energized by the radio frequency magnetic field and forms a response signal that will identify the transponder and which may provide additional information, and then transmits the response signal to the interrogator. The interrogator includes a receiver that receives the response signal and processes the information it contains. This information is then recorded by a data management system for access by the end user.

One method of radio frequency identification works on an inductive principle. Here, an interrogation station generates a magnetic field at a predetermined frequency. When the transponder enters the field, a small electric current forms in the transponder, providing power to the radio frequency identification electronic control components which then modulate the magnetic field in order to transmit the transponder's programmed data back to the interrogator. The interrogator receives the signal transmission, demodulates and decodes the transmission, and sends the data on to a host computer for further processing.

Radio frequency transponders are classified as either passive or active. Passive radio frequency transponders extract their power from the electromagnetic field provided by the interrogator, while an active radio frequency transponder includes a radio transceiver and a battery power source to enable it to transmit a signal to a remote receiver. The advantage to using active transponders is that they typically have increased range over passive transponders, but the disadvantage is that they require a battery power source to achieve that increased range.

SUMMARY OF THE INVENTION

Briefly, the present invention comprises an intelligent label comprising, in one embodiment, a radio frequency transponder coupled to a global positioning system and a substrate, the radio frequency transponder and the global positioning system being attached to the substrate.

In a further aspect of the present invention, the radio frequency transponder comprises at least one antenna and at least one integrated circuit chip.

In a further aspect of the present invention, the global positioning system comprises at least one antenna, at least one receiver, and at least one processor.

In a further aspect of the present invention, the global positioning system comprises at least one antenna and at least one integrated circuit chip.

In a further aspect of the present invention, the radio frequency transponder includes a memory for storing data.

In a further aspect of the present invention, the global positioning system includes a memory for storing data.

In a further aspect of the present invention, the invention further comprises at least one memory chip coupled to at least one of the radio frequency transponder and the global positioning system.

In a further aspect of the present invention, the invention further comprises a computer connected to at least one of the radio frequency transponder and the global positioning system.

In a further aspect of the present invention, the invention further comprises a power source connected to at least one of the radio frequency transponder and the global positioning system.

In a further aspect of the present invention, the power source comprises a printed battery.

In a further aspect of the present invention, the radio frequency transponder and the global positioning system are embedded in the substrate.

In a further aspect of the present invention, the substrate is at least part of one of a label, a badge, a package, a container, an envelope, a box, a piece of cardboard and a piece of paper.

In a further aspect of the present invention, the substrate is made from at least one of paper, synthetic paper, plastic, metal, cloth and glass.

In a further aspect of the present invention, the substrate is a label, the label comprising a front side and a back side, the back side being provided with adhesive.

In a further aspect of the present invention, the intelligent label is dimensioned to fit into a standard 4.125 inch by 9.5 inch U.S. mail envelope.

In a further aspect of the present invention, the invention further comprises at least one antenna shared by the radio frequency transponder and the global positioning system.

In a further aspect of the present invention, the invention further comprises at least one power source shared by the radio frequency transponder and the global positioning system.

In a further aspect of the present invention, the power source comprises a printed battery.

In a further aspect of the present invention, the invention further comprises a memory for storing data, the memory being shared by the radio frequency transponder and the global positioning system.

In a further aspect of the present invention, the radio frequency transponder and the global positioning system share a common processor.

In a further aspect of the present invention, the filler material is provided around the radio frequency transponder and the global positioning system to provide a label of uniform thickness.

In a further aspect of the present invention, the intelligent label comprises a radio frequency transponder coupled to a global positioning system, and
  a substrate, where the substrate comprising a liner and a face stock, wherein the radio frequency transponder and the global positioning system are positioned between the liner and the face stock, the liner being secured to the face stock.

In a further aspect of the present invention, the intelligent label comprises a radio frequency transponder coupled to a global positioning system, and
  a substrate, the substrate comprising a liner and a face stock, wherein the radio frequency transponder and the global positioning system is positioned between the liner and the face stock, the liner or the face stock being secured to at least one of the radio frequency transponder and the global positioning system.

In a further aspect of the present invention, the liner and the face stock is secured to at least one of the radio frequency transponder and the global positioning system.

In a further embodiment of the present invention, there is a method of making an intelligent label comprising the steps of obtaining a radio frequency transponder coupled to a global positioning system, and
  attaching the radio frequency transponder and the global positioning system to a substrate.

In a further aspect of the present invention, the radio frequency transponder comprises at least one antenna and at least one integrated circuit chip.

In a further aspect of the present invention, the global positioning system comprises at least one antenna, at least one receiver, and at least one processor.

In a further aspect of the present invention, the attaching step comprises embedding the radio frequency transponder and the global positioning system in the substrate.

In a further embodiment of the present invention, there is a method of making an intelligent label, comprising the steps of obtaining a substrate comprising a pressure sensitive stock and a liner, delaminating the substrate by peeling off the liner to expose an adhesive on the pressure sensitive stock, obtaining a continuous web comprising radio frequency transponders coupled to global positioning systems, cutting the web to produce web cuttings, whereby each web cutting comprises at least one radio frequency transponder coupled to at least one global positioning system, transferring a web cutting to the adhesive exposed on the pressure sensitive stock of the substrate, and relaminating the liner onto the pressure sensitive stock thereby covering the web cutting.

In a further embodiment of the present invention, there is method of making an intelligent label, comprising the steps of obtaining a substrate comprising a pressure sensitive stock and a liner, delaminating the substrate by peeling off the liner to expose the pressure sensitive stock, pattern coating the pressure sensitive stock with a hot melt adhesive, obtaining a continuous web comprising radio frequency transponders coupled to global positioning systems, cutting the web to produce web cuttings, whereby each web cutting comprises at least one radio frequency transponder coupled to at least one global positioning system, and transferring a web cutting to the pressure sensitive stock of the substrate, relaminating the liner onto the pressure sensitive stock thereby covering the web cutting.

In a further embodiment of the present invention, there is method of tracking or identifying an object, comprising the steps of obtaining an intelligent label comprising a radio frequency transponder coupled to a global positioning system, the radio frequency transponder and the global positioning system being attached to a substrate, attaching or inserting the intelligent label to the object to be tracked or identified, and tracking or identifying the object to be tracked or identified.

In a further aspect of the present invention, the tracking step comprises receiving signals from an appropriate number of GPS satellites, processing the signals into location data, and storing the location data in a memory.

In a further aspect of the present invention, the tracking step further comprises retrieving the location data from the memory.

In a further aspect of the present invention, the tracking step further comprises transmitting the location data.

In a further aspect of the present invention, the tracking step further comprises analyzing the location data retrieved from the memory.

In a further aspect of the present invention, the tracking step comprises, receiving signals from an appropriate number of GPS satellites, processing the signals into location data, and transmitting the location data.

In a further aspect of the present invention, an interrogation station receives the transmitted location data.

In a further aspect of the present invention, the identifying step comprises transmitting an identification signal.

In a further embodiment of the present invention, there is a method of tracking and identifying an object, comprising the steps of, obtaining an intelligent label comprising a radio frequency transponder coupled to a global positioning system, the radio frequency transponder and the global positioning system being attached to a substrate, attaching or inserting the intelligent label to the object to be tracked or identified, and tracking and identifying the object to be tracked and identified In practicing the above method of tracking or identifying an object, one scenario would include placing an intelligent label in or on a package that is later placed in the mail. As the package is transported, the global positioning system receives the signals from the requisite GPS satellites and processes those signals into location data. The data is then either transmitted directly to an interrogation station by the radio frequency transponder, or stored periodically in the memory of the global positioning. The memory serves to allow all or part of the previous location data to be stored for transmittal to an interrogator at a later date, such as in the instance when there is no interrogator available at the time the global positioning system takes its location readings. In this case, once the package is in range of the interrogator, it can upload the location data or any other data to the interrogator. Additionally, it is foreseen that the intelligent label will be used to facilitate changes in the routing of the package as it travels from its point of origin to is destination (or changed destination).

In another scenario, public attractions where the potential for lost or abducted children is a concern could use the intelligent label of the present invention as an emergency person locator. For example, a child could be given an intelligent label with his or her name written on the label. The label could be provided with an adhesive on one side so that it will stick to the child's shirt, or it could be provided on a wrist band. Alternatively, the label could simply be placed in the child's pants pocket, thus eliminating the need for adhesive. Interrogator stations would be arrayed in a manner so that they would be in communication with the label. If the location data provided to the interrogator comprised coordinates located outside of a desired area, an alarm would be tripped. Alternatively, a program could be created whereby the location data was automatically analyzed to detect unusual movement patterns. In any of these cases, location data could be immediately routed to parental, security, or law enforcement personnel to aid in the location of the missing child.

In another scenario, a golf course could offer its customers certain data relating to a golfer's game, utilizing the location (including elevation) of the golfer with respect to the targeted hole. The golfer could be provided with an intelligent label with his or her identification written on the label at the beginning of the game. The golfer could then initiate a data transmission at each stroke. A subsequent software application could use a mapping function to provide the golfer with a stroke-by-stroke analysis of his or her game.

In another scenario, a homeowner could affix intelligent labels to the underside of valuables, or insert the intelligent labels inside the valuables. An interrogator could routinely scan for the location of the valuables. If the data received from the tags attached to the valuables demonstrated any movement of the valuables during specified times, or movement of the valuables to a location outside a specified area, an alarm would be triggered and law enforcement would be directed to the known location, or last known location, of the valuables.

In yet another scenario, intelligent labels could be provided to persons who's movements are intended to be restricted or monitored. For example, employees who must move from work site to work site, can be given intelligent labels. At the end of each shift, the worker can be required to scan the label, thus causing information on all of the employee's movements during the day to be uploaded to a central computer for analysis. Alternatively, persons under house arrest, probation, or work release can likewise be monitored. Alternatively, persons granted visas for stay in a given country can likewise be monitored.

In yet another scenario, intelligent labels could be provided to cattle or other types of livestock or even wild animals. In such an example, the intelligent labels could be used to determine whether or not cattle has been exposed to other cattle that have tested positive for diseases such as mad cow disease.

Numerous additional scenarios can be provided, and the utility of the present invention is not limited to the scenarios just described.

DETAILED DESCRIPTION OF THE PREFERRED EMBODIMENTS

The Global Positioning System (GPS) is a constellation of twenty-four satellites that orbit the earth twice a day, transmitting precise time and positioning information to anywhere on the globe, twenty-four hours a day. The system was designed and deployed by the U.S. Department of Defense to provide continuous, worldwide position and navigation data for the use of the United States and allied military forces. The potential for commercial applications of GPS were recognized early in the system's development and a determination made to allow free access to GPS signals with certain constraints applied.

Each GPS satellite broadcasts two signals, PPS (Precise Positioning Service) and SPS (Standard Positioning Service). The PPS signal is a military-access code. The SPS is an unencrypted, spread-spectrum signal broadcast at 1,575.42 MHz. Unlike signals from Land-base navigation systems, GPS signals are virtually resistant to multi-path and nighttime interference, and are unaffected by weather and electrical noise.

GPS receivers listen to signals from either three or four satellites at a time and triangulate a position fix using the interval between the transmission and reception of the satellite signal. Any particular receiver tracks more satellites than are actually needed for a position fix. The reason for this is that if one satellite becomes unavailable, the receiver knows exactly where to find the best possible replacement. Three satellites are required for two-dimension positioning (i.e. position only). Four satellites are required for three-dimension positioning (i.e. position and elevation). In general, an SPS receiver can provide position information with an error of less than twenty-five meters and velocity information with an error of less than five meters per second. A PPS receiver permits much greater accuracy.

Recently, PPS has been made available for civilian and commercial use. As such, users of GPS may find it desirable to use the more accurate PPS instead of SPS. In addition to the GPS, the Russian Republic operates a satellite based positioning system of its own. Recently, the European Union and its associated organizations have undertaken an effort to create an independent satellite based positioning system equivalent to the U.S. GPS. Therefore, any further references to global positioning systems in this application shall be in reference to any present or future system which relies on signals from satellites to determine its position.

Figure 1:
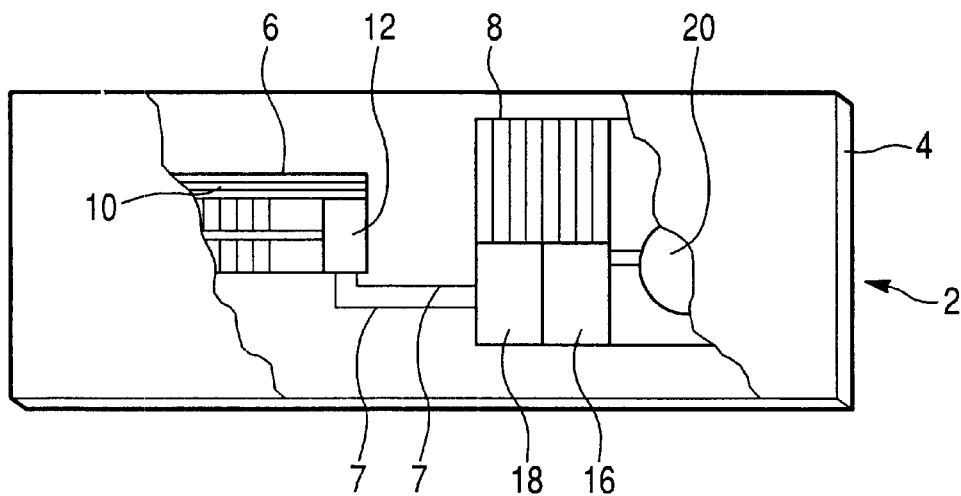
FIG. 1 is a schematic diagram of one embodiment of the intelligent label with a cutaway to show the radio frequency transponder, the global positioning system, and other associated components.

A preferred embodiment of the present invention utilizes the Global Positioning System and is shown in FIG. 1 in the context of an intelligent label 2, comprising a substrate 4 with a radio frequency transponder 6 coupled by wiring 7 or other conductive material to a global positioning system 8. As can be seen from FIG. 1, the intelligent label 2 can be rectangular in shape, and dimensioned, in a preferred embodiment, to slide into a standard 4.125 inch by 9.5 inch standard U.S. mail envelope without being folded. However, the shape of the label is not restricted to a rectangular shape and the dimensions are not restricted to these dimensions. For example, an embodiment would include a label the size of a typical credit card, a post card, a postage stamp, or the size of a side of a large cardboard box. The exact dimensions of the desired embodiments would be driven by factors including but not limited to economic factors and application factors important to the end user.

The intelligent label of the preferred embodiment would include a surface to permit the printing or writing of information on the label, such as a name, shipping destination, package contents, or a bar code. Alternatively, an embodiment is envisioned whereby the label is purposely designed to be devoid of all markings, the intention of the designer to make the label blend with the surface to which it is attached. In yet another alternative, the label is transparent or semi-transparent, allowing all or part of the surface under the label to be visible through the label.

The substrate 4 could be fabricated utilizing standard material or any other material used to make labels. Additionally, it is envisioned that the substrate 4 could be made from plastic, including polyester material, paper, synthetic paper, reinforced cardboard, synthetic paper coated cardboard, metal, or any other appropriate substance. It is also envisioned that the substrate 4 could be the wall or walls of a shipping box, a side or sides of an envelope, or even package wrapping. It could also be pressure sensitive label stock with a liner and an adhesive bearing face. It could also be a pressure sensitive tag stock with just two liners. It could also be a rigid film with a liner. It could also be a sheet of paper, an identification badge, or any other thin object.

The substrate 4 would optionally include an adhesive layer to facilitate attachment of the label to an object, or could be provided with other attachment means, such as clips or bolt holes. The adhesive layer could optionally be placed on the tag at the manufacturing site or plated on the substrate just before attachment of the label to an object, or any place or time in between. Also, it is envisioned that the object receiving the tag could have the adhesive or other attachment means, so that it is not necessary to provide an attachment means on the label.

The radio frequency transponder and the global positioning system are embedded into the substrate or coupled to the substrate and preferably do not exceed the outer boundaries of the substrate. In one embodiment, portions of the radio frequency transponder and the global positioning system are printed, while other portions are incorporated by other means. For example, antennas and wiring are prime candidates for printing, while it may be desired to attach the integrated circuits or portions of the integrated circuits separately because extremely tiny and thin circuit chips can be produced in high volume using automated techniques. In yet a third embodiment the radio frequency transponder and the global positioning system are manufactured as self contained units and are attached to the substrate in a separate manufacturing operation. Another embodiment includes a combined transponder and global positioning system manufactured as a self contained radio frequency transponder and global positioning system unit and attached to the substrate in a separate manufacturing operation. In a further embodiment, the substrate is die cut in such a way so that the substrate can serve as an antenna. U.S. Pat. Nos. 6,107,920 and 6,280,544 provide examples of radio frequency transponders in combination with substrates and are incorporated by reference herein in their entirety.

Figure 2:
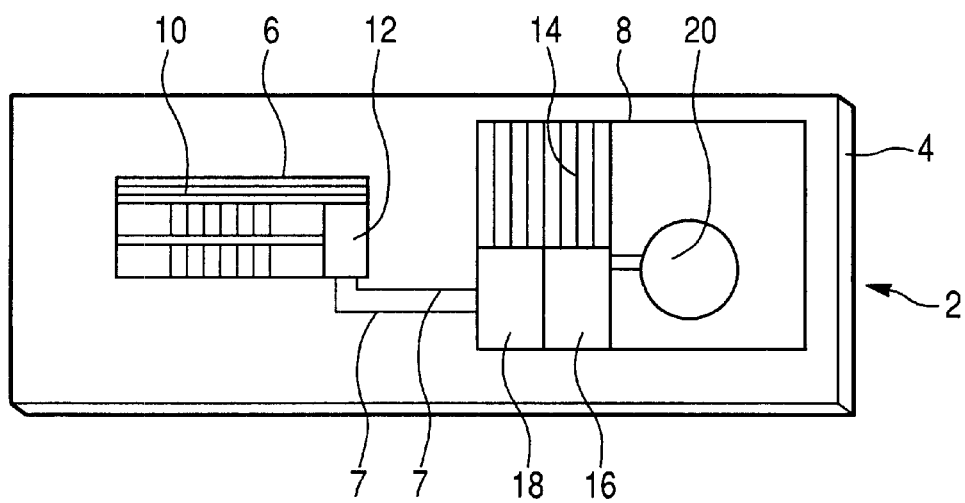
FIG. 2 is an unobstructed top view of the embodiment shown in FIG. 1.

FIG. 2 shows an unobstructed view of the intelligent label 2 with the radio frequency transponder 6. The transponder comprises an antenna 10 and an integrated circuit chip 12. If desired, a power source (not shown), such as a thin battery or a solar panel can be linked to the transponder to improve the transmission range of the transponder. The thin battery can be in the form of a printed battery such as one manufactured utilizing Texas Instrument's flexographic printed battery process. Additionally, the transponder could further include a memory for storing data. This memory could be in the form of a commercially available memory chip. An exemplary radio frequency transponder is the subject of U.S. Pat. No. 5,574,470, and is incorporated by reference herein in its entirety. An alternate exemplary radio frequency transmitter is the subject of U.S. Pat. No. 5,942,977 and is also incorporated by reference herein in its entirety. Yet another alternate exemplary radio frequency transmitter is the Motorola BiStatix inductive transmitter. However, the form of the transponder is not limited to these examples or similar examples. Likewise, the type of transponder is not limited to the specific embodiments described in the examples. It is envisioned that the transponder should be selected based on the needs of the end user. Such needs include signal range, speed of data transmittal, amount of data transmittal, frequency of data transmittal, or any special signal frequency or signal amplitude requirements.

FIG. 2 further shows the global positioning system 8 attached to the substrate 4, along with the wire coupling 7 to the transponder 6. The global positioning system 8 comprises an antenna 14, a receiver 16 and a processor 18. Also, a power source 20 is wired to the global positioning system 8. The power source can be a thin battery or a solar panel or any other power source which is compact enough to satisfy the end user's requirements. The thin battery can be in the form of a printed battery such as one manufactured utilizing Texas Instrument's flexographic printed battery process. The power source can be a shared power source between the transponder and the global positioning system. Additionally, the global positioning system would include a memory for storing data. This memory could be in the form of a commercially available memory chip. The type of global positioning system should be selected to be as compact and thin as possible. Also, the global positioning system should be designed to consume minimal power. For example, an advanced processor may not be necessary. A slower processor which consumes less power with low voltage logic circuits will satisfy the requirements of most users.

Figure 3:
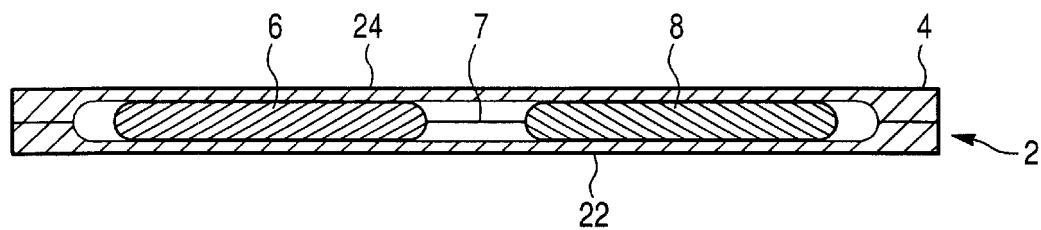
FIG. 3 is a side view of the embodiment shown in FIG. 1.

FIG. 3 shows an enlarged side view of one embodiment of the present invention. Here, the radio frequency transponder 6, again coupled by wiring 7 or other conductive material to a global positioning system 8, is embedded in the substrate 4 to form the intelligent label 2. In this embodiment, an adhesive can be applied to the back side 22 of the label in an amount suitable to secure the label to a package or other item, and printing is applied to the front side 24 of the label to provide a visual means of identifying the label. In another embodiment, it is envisioned that a filler layer is provided to keep the thickness of the label as uniform as possible. By way of example and not by limitation, a square filler sheet is obtained which has a cutout in the center large enough to contain the radio frequency transponder coupled to the global positioning system. This cutout preferably has the same thickness as the thickest portion of the radio frequency transponder and the global positioning system.

Figure 4:
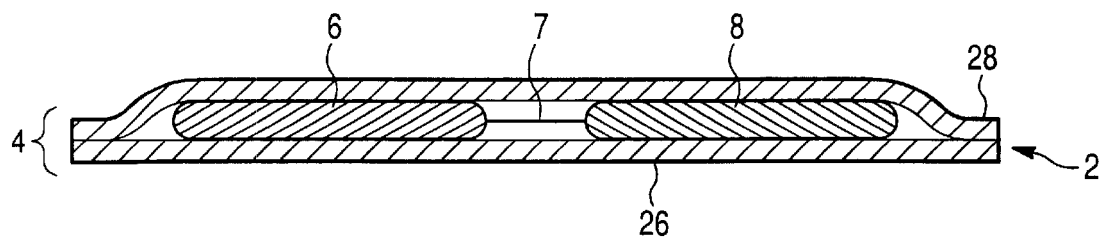
FIG. 4 is a side view of another embodiment of the present invention.

FIG. 4 shows an enlarged side view of another embodiment of the present invention. Here, the radio frequency transponder 6, again coupled by wiring 7 or other conductive material to a global positioning system 8, is embedded between a liner 26 and face stock 28, collectively making up the substrate 4, to form the intelligent label 2. In this embodiment, it is expected that adhesive be applied to either liner 26 or face stock 28 or both to so that liner 26 and face stock 28 remain secured to each other, thus securing the radio frequency transponder 6 and the global positioning system 8 inside the label. Again, it is envisioned that a filler layer can be provided to keep the thickness of the label as uniform as possible. In this embodiment, an adhesive can be applied to the back side of the label in an amount suitable to secure the label to a package or other item.

It is envisioned that many of the components of the radio frequency transponder and the global positioning system can be shared between the two components. For example, if a power source is required for the transponder, it may be appropriate to utilize the same power source that is used to power the global positioning system. Another example would be sharing the same antenna between the two components. Yet another example would be sharing the same memory between the two components. In embodiments where the components are shared, it is envisioned that a switching unit may be advantageous or even necessary. By way of example and not by limitation, in the case of a shared power source, it may not be necessary to continuously power both the transponder and the global positioning system. In such circumstances, power could be switched from one component to the other depending on which component was needed. Additionally, shared components may be segmented so that one portion supports the radio frequency transponder, while another portion supports the global positioning system. It is also envisioned that a specialized user could desire a more complicated intelligent label. For example, it is envisioned that a miniaturized computer could be attached to either the global positioning system or the radio frequency transponder, the entire system being attached to a substrate.

A variety of methods may be used to manufacture the intelligent label of the present invention. For example, in making the intelligent label, a method is envisioned whereby substrate comprising a pressure sensitive stock and a liner is unwound. At this point in the process, the user can print on the substrate if desired. Next, the substrate is delaminated by peeling off the top layer (i.e., the liner) to expose an adhesive on a lower layer (i.e., the pressure sensitive stock). The peeled-off top layer is carried through the manufacturing process and eventually, as described below, is rejoined with the lower layer.

While the substrate is being unrolled and delaminated, a continuous web containing radio frequency transponders and global positioning systems is unrolled and die cut into separate transponder/global positioning system units. The individual radio frequency transponder/global positioning system units are then transferred to the adhesive exposed on the lower layer. At this point, a hot melt adhesive may be applied to the top side of the lower layer covering the radio frequency transponder and global positioning system units positioned thereon, if required.

After the radio frequency transponder and global positioning system units are applied to the lower layer (and after a hot melt adhesive layer is applied, if required), the top layer is relaminated onto the lower layer thereby covering the radio frequency transponder and global positioning system units attached thereto. Finally, the substrate (comprising both the top layer, lower layer, and radio frequency transponder and global positioning system units) is die cut into sheets, each of which contains a radio frequency transponder coupled to a global positioning system.

A second method is envisioned of making an intelligent label. In this method, a substrate comprising a pressure sensitive stock and a liner is unwound. At this point in the process, the user may print on the substrate, if required. Following the printing process, the substrate is delaminated by peeling off the top layer (i.e., the liner) to expose a lower layer (i.e., the pressure sensitive stock). The lower layer is pattern (or flood) coated with a hot melt adhesive, while the peeled-off top layer is carried through the manufacturing process, to be eventually rejoined with the lower layer, as described below.

While the substrate is being unrolled and delaminated, a continuous web containing radio frequency transponder and global positioning system units is unrolled and die cut into separate units. Individual radio frequency transponder and global positioning system units are then transferred to the hot melt adhesive exposed on the lower layer. At this point, additional hot melt adhesive may be applied to the top side of the lower layer thereby covering the radio frequency transponder and global positioning system units placed thereon, if required.

After the radio frequency transponder and global positioning system units are applied to the lower layer (and after an additional hot melt adhesive layer is applied, if required), the top layer is relaminated onto the lower layer thereby covering the radio frequency transponder and global positioning system units attached thereto. Finally, the substrate (comprising both the top layer, lower layer, and radio frequency transponder and global positioning system units) is die cut into sheets each of which contains a radio frequency transponder and global positioning system units.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An intelligent label comprising:
    a radio frequency transponder coupled to a global positioning system; and
    a flexible substrate, said radio frequency transponder and said global positioning system being attached to said substrate.

2. The label of claim 1, wherein said radio frequency transponder comprises at least one antenna and at least one integrated circuit chip.

3. The label of claim 1, wherein said global positioning system comprises at least one antenna, at least one receiver, and at least one processor.

4. The label of claim 1, wherein said global positioning system comprises at least one antenna and at least one integrated circuit chip.

5. The label of claim 1, wherein said radio frequency transponder includes a memory for storing data.

6. The label of claim 1, wherein said global positioning system includes a memory for storing data.

7. The label of claim 1, further comprising at least one memory chip coupled to at least one of said radio frequency transponder and said global positioning system.

8. The label of claim 1, further comprising a computer connected to at least one of said radio frequency transponder and said global positioning system.

9. The label of claim 1, further comprising a power source connected to at least one of said radio frequency transponder and said global positioning system.

10. The label of claim 9, wherein said power source comprises a printed battery.

11. The label of claim 1, wherein said radio frequency transponder and said global positioning system are embedded in said substrate.

12. The label of claim 1, wherein said substrate is at least part of one of a label, a badge, a package, a container, an envelope, a box, a piece of cardboard and a piece of paper.

13. The label of claim 1, wherein said substrate is made from at least one of paper, synthetic paper, plastic, metal, cloth and glass.

14. The label of claim 1, wherein said substrate is a label, said label comprising a front side and a back side, said back side being provided with adhesive.

15. The label of claim 1, wherein said intelligent label is dimensioned to fit into a standard 4.125 inch by 9.5 inch U.S. mail envelope.

16. The label of claim 1, further comprising at least one antenna shared by said radio frequency transponder and said global positioning system.

17. The label of claim 1, further comprising at least one power source shared by said radio frequency transponder and said global positioning system.

18. The label of claim 17, wherein said power source comprises a printed battery.

19. The label of claim 1, further comprising a memory for storing data, said memory being shared by said radio frequency transponder and said global positioning system.

20. The label of claim 1, wherein said radio frequency transponder and said global positioning system share a common processor.

21. The label of claim 1, wherein filler material is provided around said radio frequency transponder and said global positioning system to provide a label of uniform thickness.

22. An intelligent label comprising:
a radio frequency transponder coupled to a global positioning system; and
a substrate, said substrate comprising a liner and a face stock, wherein said radio frequency transponder and said global positioning system are positioned between said liner and said face stock, said liner being secured to said face stock.

23. An intelligent label comprising:
a radio frequency transponder coupled to a global positioning system; and
a substrate, said substrate comprising a liner and a face stock, wherein said radio frequency transponder and said global positioning system is positioned between said liner and said face stock, said liner or said face stock being secured to at least one of said radio frequency transponder and said global positioning system.

24. The label of claim 23, wherein said liner and said face stock is secured to at least one of said radio frequency transponder and said global positioning system.

25. A method of making an intelligent label, comprising the steps of:
obtaining a radio frequency transponder coupled to a global positioning system; and
attaching said radio frequency transponder and said global positioning system to a flexible substrate.

26. The method of making an intelligent label of claim 25, wherein said radio frequency transponder comprises at least one antenna and at least one integrated circuit chip.

27. The method of making an intelligent label of claim 25, wherein said global positioning system comprises at least one antenna, at least one receiver, and at least one processor.

28. The method of making an intelligent label of claim 25, wherein said attaching step comprises embedding said radio frequency transponder and said global positioning system in said substrate.

29. A method of making an intelligent label, comprising the steps of:
obtaining a substrate comprising a pressure sensitive stock and a liner;
delaminating said substrate by peeling off said liner to expose an adhesive on said pressure sensitive stock;
obtaining a continuous web comprising radio frequency transponders coupled to global positioning systems;
cutting said web to produce web cuttings, whereby each web cutting comprises at least one radio frequency transponder coupled to at least one global positioning system;
transferring a web cutting to the adhesive exposed on said pressure sensitive stock of said substrate; and
relaminating said liner onto said pressure sensitive stock thereby covering said web cutting.

30. A method of making an intelligent label, comprising the steps of:
obtaining a substrate comprising a pressure sensitive stock and a liner;
delaminating said substrate by peeling off said liner to expose said pressure sensitive stock;
pattern coating said pressure sensitive stock with a hot melt adhesive;
obtaining a continuous web comprising radio frequency transponders coupled to global positioning systems;
cutting said web to produce web cuttings, whereby each web cutting comprises at least one radio frequency transponder coupled to at least one global positioning system; and
transferring a web cutting to said pressure sensitive stock of said substrate;
relaminating said liner onto said pressure sensitive stock thereby covering said web cutting.

31. The method of tracking or identifying an object, comprising the steps of:
obtaining an intelligent label comprising a radio frequency transponder coupled to a global positioning system, said radio frequency transponder and said global positioning system being attached to a flexible substrate;
attaching or inserting said intelligent label to the object to be tracked or identified; and
tracking or identifying said object to be tracked or identified.

32. The method as defined in claim 31, wherein the tracking step comprises:
receiving signals from an appropriate number of GPS satellites;
processing said signals into location data; and
storing said location data in a memory.

33. The method as defined in claim 32, wherein the tracking step further comprises retrieving said location data from said memory.

34. The method as defined in claim 32, wherein the tracking step further comprises transmitting said location data.

35. The method as defined in claim 33, wherein the tracking step further comprises analyzing said location data retrieved from said memory.

36. The method as defined in claim 31, wherein the tracking step comprises:

receiving signals from an appropriate number of GPS satellites;

processing said signals into location data; and transmitting said location data.

37. The method as defined in claim 36, wherein an interrogation station receives said transmitted location data.

38. The method as defined in claim 31, wherein the identifying step comprises transmitting an identification signal.

39. The method of tracking and identifying an object, comprising the steps of:

obtaining an intelligent label comprising a radio frequency transponder coupled to a global positioning system, said radio frequency transponder and said global positioning system being attached to a flexible substrate;

attaching or inserting said intelligent label to the object to be tracked or identified; and tracking and identifying said object to be tracked and identified.

40. The label of claim 1, wherein said substrate is unrolled substrate stock.

41. The method of claim 25, further comprising unrolling said substrate from a roll prior to attaching said radio frequency transponder and said global positioning system to said substrate.

42. The label of claim 31, wherein said substrate is unrolled substrate stock.

43. The label of claim 39, wherein said substrate is unrolled substrate stock.

* * * * *